United States Patent [19]

Schneider et al.

[11] 4,444,463

[45] Apr. 24, 1984

[54] GLASS FIBERS WITH TRANSVERSE OPENINGS AND METHODS OF THEIR PRODUCTION

[75] Inventors: Hartmut Schneider, Munich; Friedrich Weidinger, Taufkirchen, both of Fed. Rep. of Germany

[73] Assignee: Siemens Aktiengesellschaft, Berlin & Munich, Fed. Rep. of Germany

[21] Appl. No.: 252,082

[22] Filed: Apr. 8, 1981

[30] Foreign Application Priority Data

Apr. 30, 1980 [DE] Fed. Rep. of Germany ....... 3016705

[51] Int. Cl.³ .................... G02B 5/14; C03B 37/075
[52] U.S. Cl. ......................... 350/96.33; 65/2; 65/3.11; 428/399
[58] Field of Search ............ 65/2, 3.11, 4.21, 13; 264/1.5, 1.7, 2.7; 428/399; 350/96.15, 96.33

[56] References Cited

U.S. PATENT DOCUMENTS

| | | | |
|---|---|---|---|
| 2,122,972 | 7/1938 | Arbib | 428/399 |
| 3,496,931 | 2/1970 | Pilling | 65/4.21 X |
| 3,887,264 | 6/1975 | Kompfner | 350/96.33 X |
| 3,902,089 | 8/1975 | Beasley et al. | 65/2 X |
| 4,054,366 | 10/1977 | Barnoski et al. | 350/96.15 |
| 4,083,625 | 4/1978 | Hudson | 350/96.15 |
| 4,111,521 | 9/1978 | Streifer | 350/96.15 X |
| 4,315,666 | 2/1982 | Hicks, Jr. | 350/96.15 |

FOREIGN PATENT DOCUMENTS

| | | |
|---|---|---|
| 2510114 | 9/1976 | Fed. Rep. of Germany . |
| 2729008 | 1/1978 | Fed. Rep. of Germany . |
| 53-91752 | 8/1978 | Japan ................ 350/96.15 |
| 54-101334 | 8/1979 | Japan ................ 350/96.15 |
| 54-158239 | 12/1979 | Japan ................ 350/96.33 |

OTHER PUBLICATIONS

S. K. Sheem et al., "Single-Mode Fiber-Optical Power Divider: Encapsulated Etching Technique," *Optics Letters*, vol. 4, No. 1, Jan. 1979, pp. 29–31.

S. K. Sheem et al., "Acoustic Sensitivity of Single-Mode Optical Power Dividers," *Optics Letters*, vol. 4, No. 10, Oct. 1979, pp. 322–324.

*Primary Examiner*—Richard V. Fisher
*Attorney, Agent, or Firm*—Hill, Van Santen, Steadman & Simpson

[57] ABSTRACT

A glass fiber for use as a light waveguide characterized by a one piece member having at least one transverse opening extending through the fiber to subdivide a section of the fiber into two portions connected at each end by the zones of the fiber free of the opening. By cutting in the area of the opening, a branch fiber can be produced. Preferably, the fiber includes a pair of cores which are separated by the openings. The method includes drawing the fiber from a mass of softened glass and while in the softened state, forming the openings therein or by drawing the fiber from a preform having at least one transverse extending opening. Preferably the preform is formed by joining two members having flat surfaces together and the openings in the preform are formed by forming transverse grooves in one of the flat surfaces.

13 Claims, 7 Drawing Figures

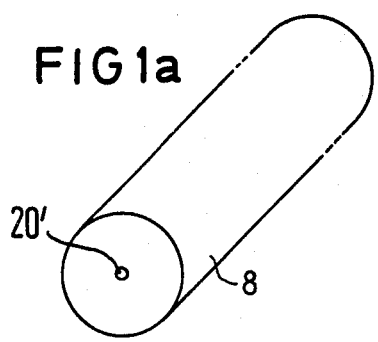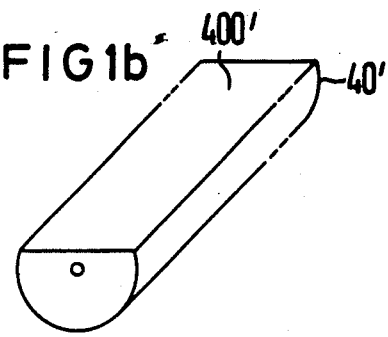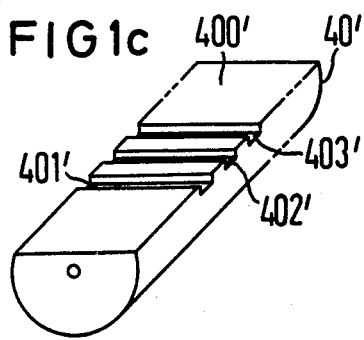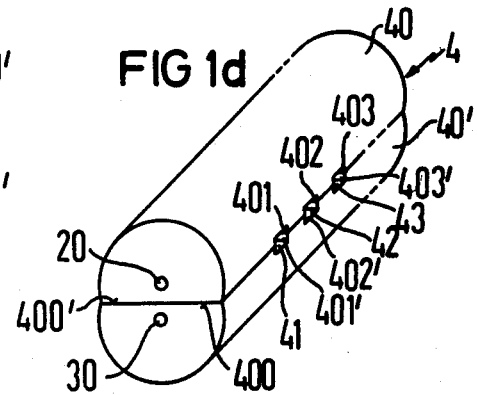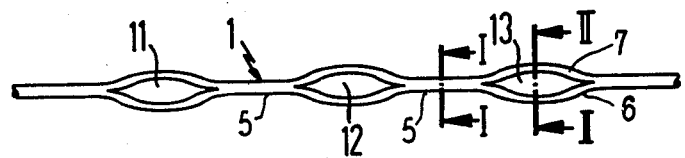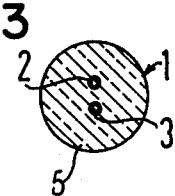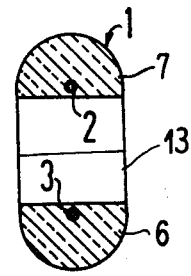

GLASS FIBERS WITH TRANSVERSE OPENINGS AND METHODS OF THEIR PRODUCTION

BACKGROUND OF THE INVENTION

The present invention is directed to a glass fiber for use as a light waveguide and a method of producing the glass fiber.

For a glass fiber network for the distribution of optical signals in communication systems, glass fiber branches are required. A glass fiber branch is disclosed in German O.S. No. 25 10 114, which branch consists of a glass fiber which is split from one end along its axis into two partial strands. The splitting is obtained by the fiber being drawn from a massive parent body and the parent body being subjected to local overheating. Thus, a greater temperature gradient is generated in the shaping and softening zone of the fiber optical waveguide. This temperature gradient is frozen into the finished optical waveguide during the cooling of the fiber to produce thermal stresses and thus a splitting tendency of the fiber optical waveguide or fiber will occur along its axis. With the breaking of the fiber produced in this manner, a fiber piece is obtained with the longitudinal split with a certain efficiency.

SUMMARY OF THE INVENTION

The present invention is directed to providing a glass fiber which is exceptionally suitable for the production of glass fiber branches and which can be produced in a simple manner.

To accomplish these objects, the present invention is directed to a glass fiber for use as a light waveguide, said glass fiber comprising a one piece member having at least one transverse opening extending through the fiber to subdivide a section of the fiber between two zones into two portions which are connected at each end in the zones. Preferably, a plurality of transverse openings are spaced along the axis of the fiber by the zones to create spaced sections that are subdivided into two portions and connected by solid zones of the fiber.

From this fiber, branches can be obtained simply by means of subdividing the fiber in the regions of the openings. Branches can be obtained with a high efficiency from this proposed fiber.

To produce a fiber which is a one piece member and has at least one transverse opening causing a section of the fiber between two zones to have two spaced portions can be accomplished by a method which comprises the steps of drawing the fiber from a softened glass and while the drawn fiber is still in a soft state forming a transverse opening through the fiber while taking the necessary measures to prevent the opening from being completely closed. The taking of measures to prevent the opening from being completely closed includes selecting desired properties for the drawing velocity, the viscosity of the material being drawn into the fiber and the surface tension of the softened glass so that the opening formed in the softened glass can no longer completely close itself or become fused back together.

It should be noted that a particularly advantageous method involves the step of drawing and forming the openings by providing a preform of the fiber or workpiece which has a hole for each opening to be formed in the fiber, heating the preform to a drawing temperature and drawing the preform into the fiber having at least one section between two zones with the opening separating two interconnected portions from each other.

A special advantage of the invention consists in the simple manner that the fiber will be produced which fiber displays a pair of spaced cores having an index of refraction which is greater than the remaining portion of the fiber which acts as a cladding layer. Each of the cores will extend in a longitudinal direction with one being disposed on each side of each opening of the fiber. In the zones of the fiber which are free of openings, the cores are disposed close enough to each other so that the light in one core can couple into the opposite core. A directional coupler can be easily produced by cutting the fiber having the cores in the regions of each opening.

To obtain the fiber with the pair of cores, the preferred method includes providing the preform with a pair of spaced cores and having transverse openings extending therebetween. This preform is then heated and drawn into the fiber.

A method for the production of glass fibers directional couplers is disclosed in German O.S. No. 27 29 008. In this disclosure, two glass fibers which have a single light guiding fiber core are glued or welded together. However, it is not certain whether a directional coupler can be produced for a single mode fiber with for example a 5 μm core diameter. In any case, for the attainment of core spacings which are suitable for the coupling of the fiber for coupling, the fiber sheath or cladding must be partially etched away before the joining operation. A coupler produced by etching as disclosed in the article entitled "A Single-Mode Fiber Optical Power Divider: Encapsulated Etching Techniques," *Opt. Lett.*, Vol. 4, 1979, pages 29–31 for single mode fibers has proven to be sensitive to accoustial waves as disclosed in an article entitled: "Acoustic Sensitivity of Single-Mode Optical Power Dividers," *Opt. Lett.*, Vol. 4, 1979, pages 322–324. Thus, significant difficulties will occur in the precise removal of the sheath or cladding for the fiber which at first is approximately 100 μm thick. Also, problems occur in maintaining a definite spacing between the fiber cores which is approximately 5 μm thick and finally in selecting a suitable medium which after the etching will function as an optical sheath and will influence the coupling relationship.

The problems just described do not occur in the fiber according to the present invention in which a pair of optical cores are contained in the fiber and extend on opposite sides of the transverse openings or if they do occur, they only occur to a slight degree. The fiber of the present invention is easily produced as a single mode fiber. A particularly advantageous method of producing the fiber having the cores on opposite sides of each opening is by producing a preform or workpiece which has two cores each of an index of refraction higher than the remaining portion of the workpiece and with the cores being spaced apart with the desired dimension so small so that when the workpiece is drawn out into the fiber, the zones in which the cores are not separated by openings will have the desired dimensionings to have the desired coupling therebetween. Preferably, this is accomplished by forming the preform from two glass bodies each having a core and flat surfaces that extend parallel to the cores which allow the two bodies to be secured together to form the preform with the desired spacing therebetween. The openings in the preform are formed by forming a groove in at least one and preferably both of the flat surfaces of the two glass bodies prior to joining the bodies together preferably with the grooves aligned. Significant advantages can be seen from the fact that the shape of the couplers before the drawing of the fiber can be easily controlled also in that the subsequent adjustment of the coupler is possible for example by means of vending and/or by means of separating the two core fiber and finally a multiplicity of couplers are obtained during one drawing process. In addition, the coupler is not sensitive to acoustical waves.

BRIEF DESCRIPTION OF THE DRAWINGS

FIGS. 1a, 1b, 1c and 1d show sequential steps in forming the workpiece which is subsequently drawn into the fiber in accordance with the present invention;

FIG. 2 is a side view of a fiber in accordance with the present invention which is drawn from the preform of FIG. 1d;

FIG. 3 is a cross-sectional view taken along the lines I—I of FIG. 2; and

FIG. 4 is a cross-sectional view of a fiber taken along lines II—II of FIG. 2.

DESCRIPTION OF THE PREFERRED EMBODIMENTS

The principles of the present invention are particularly useful when incorporated in a glass fiber generally indicated at 1 in FIG. 2 which is used as a light waveguide. The glass fiber 1 is illustrated as having three transverse openings 11, 12 and 13 which are spaced along the length of the fiber and separated by zones 5 which are free of the openings. Each of the openings such as the opening 13 separate the section of the fiber into two portions 6 and 7 which are spaced apart and which are interconnected at their ends in the zones which are free of the opening.

As best illustrated in FIGS. 3 and 4, the fiber 1 contains a pair of cores 2 and 3 which have an index of refraction which is higher than the index of refraction remaining portion of the material forming the fiber 1. As illustrated, each of the cores 2 and 3 will extend on each side of the opening so that the core 2 will be in the portion such as 7 while the core 3 is in the portion such as 6 which is on the other side of the opening 13.

To produce the fiber 1, a preferred method is to draw the fiber from a preform generally indicated at 4 in FIG. 1d. The preform 4 is formed by beginning with two cylindrical glass rods such as a glass rod 8 of FIG. 1a which has a cylindrical cross-section and contains a core 20' which has an index of refraction greater than the remaining portion of the rod.

Each of these rods 8 are then ground on one side in such a manner to form a glass body 40 or 40' that has a flat surface such as 400 or 400' that is planar and extends parallel to the cylindrical axis. In the flat surface such as 400', a plurality of spaced grooves such as 401', 402' and 403' are cut to extend perpendicular to the longitudinal direction of the body 40' and to extend across the entire flat surface 400'. These are arranged in the longitudinal spacing and sequentially. The grooves can, for example, be produced by means of etching or by sawing of the glass body and will produce a structure which is illustrated in FIG. 1c. The depth of the groove is selected to be smaller than the spacing of the core from the flat surface and thus guarantees that the core is not damaged. The width of each groove and the spacing between the two grooves is selected to be equal for both glass bodies.

The glass bodies 40 with the grooves 401–403 and the bodies 40' with the grooves 401'–403' are then brought together in such a manner that the flat surfaces 400 and 400' engage each other and the grooves 401–403 of the body 40 are aligned with the grooves 401'–403' of the body 40'. The two grooves 401 and 401' or 402 and 402' or 403 and 403' in each case form a hole 41, 42 or respectively 43 which extends transverse through the composite body 4. These two glass bodies 40 and 40' are then welded together with an auxiliary rod on each end face and in the manner are bound with one another into the final preform or workpiece 4 with cores 20 and 30.

This workpiece or preform 4 is then heated to soften the glass in the manner known per se and then a fiber is drawn therefrom. It is necessary that one pay attention so that holes 41, 42 and 43 during the drawing of the softening glass do not completely fuse together with one another. This can be obtained by means of coordination of both the drawing velocity, the viscosity of the softened glass and/or by the surface tension. If these conditions are properly observed, then a fiber 1 of FIG. 2 will occur and have openings such as the spaced openings 11, 12 and 13.

From the fiber 1 of FIG. 2, a branch or coupler can be produced by cutting the fiber in the region in one of the openings such as 11–13.

In order that fusing together of the holes or opening are more difficult in the above described method, it is practical to treat the interior walls of each of the holes such as 41, 42 or 43 of the workpiece 4 to make the fusion more difficult. This can proceed for example in such a manner that a carbon film is applied on the interior surface of the hole which carbon film during the drawing of the fiber completes a reaction with the quartz glass and produces a gaseous product for example, SiO and CO which because of the vapor pressure prevents the fusing together of the walls of each opening. It is desirable that the carbon film is applied onto the surfaces of the grooves 401–403 and 401'–403' before the bringing together of the two bodies 40 and 40'.

In a sample embodiment, a core cladded glass rod with an undoped core were used. Such rods are distributed by the firm Heraerus under the tradename HERASIL ® and will hardly differ in their mechanical and thermal properties from a quartz glass preform for a single mode fiber having a $GeO_2$ doping in the core. The diameter of each rod amounts to approximately 10 mm.

With the help of a rotating grinder for each rod, the flat surface such as 400 and 400' are produced specifically in such a manner that the spacing of the axis in each of the cores from the flat surface amounts to 1 mm.

In the ground flat surface of each rod, grooves are then cut or sawed. The depth of the groove amounts to 0.5 mm and have a width of 0.3 mm with a spacing between two grooves amounting to 0.6 mm. It should be noted that the spacing between the two grooves will be the main factor for determining the coupler length. The width of the grooves can be freely selected.

The flat surfaces, which have been provided in this manner along a length of 30 mm with grooves are then held together and welded at the two ends with one auxiliary rod each to form the preform. The preform is then heated at a muffle temperature of 1950° C. and a fiber was drawn with the drawing velocity of 20 m/min to produce a fiber 1 having a 100 μm diameter. The length of each opening or hole amounts to approximately 1.5 m with a spacing between adjacent openings or holes amounting to approximately 7.5 m.

When the spacing between the cores in the preform, is selected to be sufficiently small, the cores will be fused with one another between the openings and then branches are obtained. The branches could also be obtained from a preform which had been perforated and did not contain any cores. A coupler can be obtained also by means of splicing of two branched pieces.

The method for the production of the fiber having openings and either having cores or being free of cores can also be transformed easily into an exceptional method for the production of a two core optical fiber. Thus, one only needs to provide a pair of rods having flat surfaces which are free of the grooves. In this embodiment, the production of a continuous two core fiber starts with a pair of rods which display a core of synthetic quartz glass surrounded by a sheath or cladding of $B_2O_3$-$SiO_2$ glass and an outer casing of a technical quartz glass. The rods are produced according to a chemical vapor deposition method. The total diameter amounts to 9.8 mm, the diameter of the optical sheath is 5.2 mm and the diameter of the core is 0.8 mm. On each rod a flat surface is ground so that the spacing of the axis of the core from the flat surface amounts to 1.15 mm. The two rods having the flat surfaces are then brought together in and auxilliary rod of quartz glass is fused onto both ends.

The preform thus obtained in this manner is drawn into a fiber which is provided directly behind the drawing with a protective layer. The diameter of this fiber amounts to 70 μm, the diameter of the optical sheath is 39 μm, the cores have a diameter of 4 to 5 μm and a spacing between the cores amounts to approximately 13 μm. It turns out that the coupling relationship of the fiber can be changed by means of bending the fiber. It is thus suitable for forming a bending sensitive sensor.

Although various minor modifications may be suggested by those versed in the art, it should be understood that we wish to embody within the scope of the patent granted hereon, all such modifications as reasonably and properly come within the scope of our contribution to the art.

We claim:

1. A glass fiber used as a light waveguide, said glass fiber comprising a one piece member having at least one transverse opening extending therethrough to subdivide a section of the fiber into two portions connected at each end in the zones of the fiber free of the opening.

2. A glass fiber according to claim 1, which has a plurality of transverse openings spaced along the length of the fiber by a zone free of the openings, each opening separating a section of the fiber between into two portions which are connected at their ends in the zones free of the opening.

3. A glass fiber according to claim 1, wherein the fiber contains two cores of a material with an index of refraction higher than the index of refraction of the remaining portion of the fiber, each of said cores extending in a longitudianal direction with one being disposed on each side of each opening of the fiber, said cores in the zones free of openings being disposed in the fiber sufficiently close to each other so that light in one core can couple over into the other core.

4. A method of producing a glass fiber having at least one transverse opening, each opening subdividing a section of the fiber into a pair of portions which are connected at each end in the zones of the fiber free of the opening, said method comprising the steps of providing a mass of softened glass, drawing a fiber from the mass of softened glass and forming at least one transverse opening through the fiber while the fiber is still in a soft state and taking measures to prevent the opening from being completely closed during the drawing operation.

5. A method according to claim 4, wherein the step of taking measures to prevent the closing of each opening comprises the selecting of the desired properties for the drawing velocity, the viscosity of the softened glass being drawn into the fiber and the surface tension of the softened glass so that the opening formed in the softened glass can no longer completely close itself and be fused together.

6. A method according to claim 4, wherein the step of providing, drawing and forming each opening comprises providing a preform for the fiber, said preform having a hole for each opening to be formed in the fiber, heating the preform into a drawing temperature and drawing the preform to a fiber having at least one opening extending transversely therethrough.

7. A method according to claim 6, wherein the step of limiting the closing of the openings comprises subjecting each of the openings in the preform with a treatment to prevent the closing of the opening from occurring during the heating and drawing steps.

8. A method according to claim 6, wherein the preform has two cores of a material of an index of refraction greater than the remaining portion of the preform, said cores extending substantially parallel to each other and extending on opposite sides of each opening in the preform and with a distance between the cores being so that subsequent to drawing, the zones of the fiber free of the openings have the cores sufficiently close together to enable coupling of light in one core into the other core.

9. A method according to claim 4, wherein the step of providing the softened glass, heating, drawing and forming the openings comprises the steps of providing two glass bodies, forming a flat surface running parallel to the axis of each of the glass bodies, forming at least one transverse groove in a flat surface of at least one of the glass bodies, assemblying the two glass bodies together with their flat surfaces engaging each other, and securing to form a preform having at least one opening extending transverse therethrough, then subsequently heating the preform and drawing the preform into the fiber having at least one opening therein.

10. A method according to claim 9, which includes forming at least two grooves in each of the flat surfaces of the two glass bodies and the step of assemblying includes assemblying the two glass bodies with the flat surfaces engaged and the grooves aligned opposite to each other in aligned pairs.

11. A method according to claim 9, wherein each of the glass bodies includes a core of a material having an index of refraction higher than the remaining portion of the glass bodies, said cores extending parallel to the axis of the body, and the step of forming the groove in one of the flat surfaces forms at least two spaced grooves therein so that the fiber drawn from the preform has a core extending on opposite sides of each opening.

12. A method according to claim 11, wherein the step of forming the groove forms at least two grooves in each flat surface and the step of assemblying assembles the two bodies with the grooves in the two flat surfaces aligned in pairs.

13. A method of producing a multicore glass fiber for use as light waveguides, said method comprising the steps of providing two glass bodies, each of said glass bodies containing a core of a material having an index of refraction greater than the index of refraction of the remaining material, providing each glass body with a flat planar surface extending parallel to the core, forming at least one groove in one of the flat planar surfaces extending transverse to the core, said groove having a depth less than the distance of the core from the flat planar surface, assembling the two glass bodies together with the flat planar surfaces engaged, securing the bodies in the assembled position, heating the bodies to a drawing temperature and subsequently drawing a multicore glass fiber from the heated assembly, said step of drawing including preventing each opening formed by each groove from closing so that the fiber has at least one section having two portions spaced by the opening and interconnected at their ends in the zones of the fiber free of the opening.

* * * * *